Aug. 7, 1956     D. SAMIRAN     2,757,966
PIPE COUPLING

Filed Nov. 6, 1952     2 Sheets-Sheet 1

INVENTOR,
DAVID SAMIRAN
BY
Lockwood, Galt, Woodard, & Smith
ATTORNEYS

Aug. 7, 1956  D. SAMIRAN  2,757,966
PIPE COUPLING
Filed Nov. 6, 1952  2 Sheets-Sheet 2
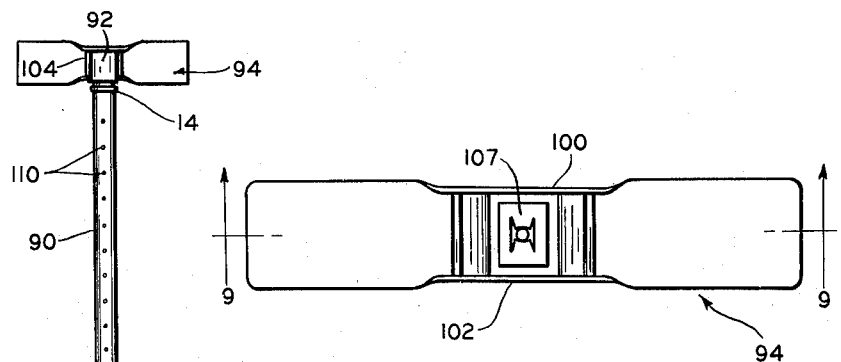
FIG. 7
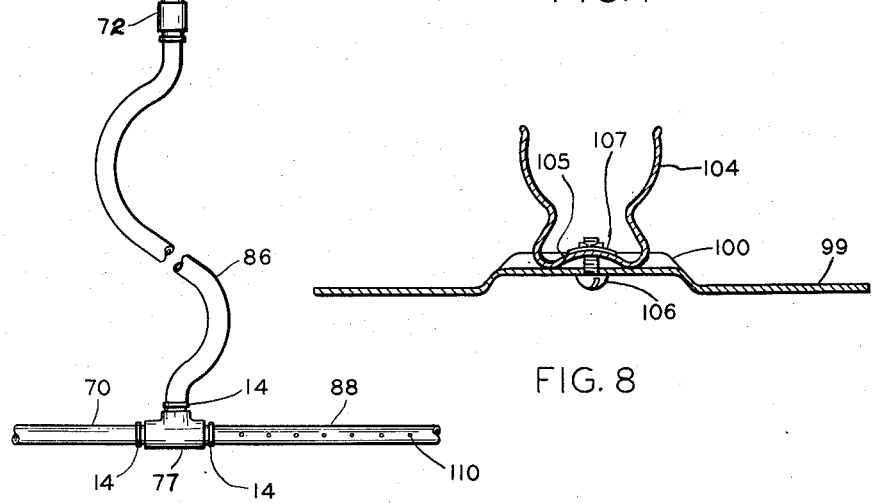
FIG. 8
FIG. 4
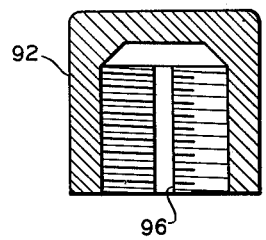
FIG. 6
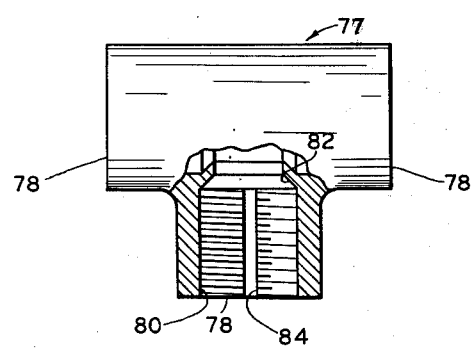
FIG. 5
INVENTOR.
DAVID SAMIRAN
BY
Lockwood, Galt, Woodard, & Smith
ATTORNEYS

United States Patent Office 2,757,966
Patented Aug. 7, 1956

2,757,966

PIPE COUPLING

David Samiran, Fort Wayne, Ind.

Application November 6, 1952, Serial No. 318,993

8 Claims. (Cl. 299—105)

The present invention relates to pipe couplings, and more particularly to coupling devices for joining the ends of two tubular sections of pipe or the like together.

An object of this invention is to provide a pipe coupling for use in joining the ends of two sections of tubular piping made of plastic or the like material, the arrangement of such coupling providing, when said sections are joined together, a continuous, all-plastic passageway throughout the entire length of the joined tubing sections.

A further object of this invention is to provide a pipe coupling which will assure relative position consistency in the joinder of two tubing sections whereby corresponding, axially extending portions on the two tubing sections will be axially alined in identical relationship regardless of the number of times said coupling is operated to attach or detach the tubing sections.

A further object of this invention is to provide a combination metal and plastic or the like coupling which may be used to join the ends of two sections of plastic tubing together in such a manner that any fluid conducted by the joined tubing sections will not be communicated to the metallic parts of the coupling itself. In the accomplishment of this object it is proposed to utilize the metallic parts of the coupling as the coupling clamps by which the ends of the tubing sections are forcefully joined together.

It is a further object of this invention to provide a pipe coupling which needs no gaskets for insuring against fluid leakage around the coupling joint.

It is still another object of this invention to provide a pipe coupling for joining two sections of piping together whereby the joined ends of such sections are accurately positioned radially with respect to each other, the arrangement which provides this radial centering also serving to provide an axially rigid joint which will resist any bending moments which might be applied along the axis of the coupling, thereby insuring against leakage at the joint which might be caused in conventional constructions, by separation of the coupling parts by reason of aforesaid bending moments.

It is yet another object of this invention to provide a pipe coupling construction which may be used for (a) coupling a section of plastic tubing to a section of metal tubing; (b) coupling a section of plastic tubing to another section of plastic tubing; and (c) coupling a section of metal tubing to another section of metal tubing.

It is a further object of this invention to provide a disassemblable sprinkling system arranged to provide an assembled length, either straight or curved, of spraying conduit sections which, when repeatedly assembled and disassembled, will retain proper spraying alignment throughout the system.

Other objects will become apparent as the description proceeds.

To the accomplishment of the above and related objects, my invention may be embodied in the form illustrated in the accompanying drawings, attention being called to the fact, however, that the drawings are illustrative only, and that specific change may be made in the specific constructions illustrated and described, so long as the scope of the appended claims is not violated.

In the drawings,

Fig. 4 is a fragmental illustration of another system which incorporates the couplings of the preceding figures;

Fig. 5 is a partial section of a T-coupling which is used in the system of Fig. 4;

Fig. 6 is a cross section of the tip fitting;

Fig. 7 is a top plan view of the positioning support of Fig. 4; and

Fig. 8 is a longitudinal section of the same support taken substantially on section line 9—9 of Fig. 7.

Figure 1:
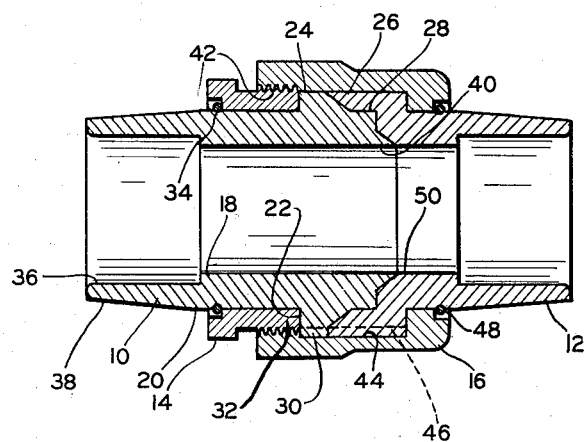
Fig. 1 is an axial section of one embodiment of the present invention.

With reference first to Fig. 1 of the drawings, the coupling there illustrated may be said to comprise essentially of four parts, viz., a tubular male or coupling nipple 10, a tubular female or coupling receptacle 12, an externally threaded annular clamp 14, and an internally threaded annular fitting 16. The coupling parts 10 and 14 comprise one half of the coupling assembly, while the parts 12 and 16 constitute the second half of the coupling assembly.

Considering first the male sub-assembly of the coupling unit, the nipple 10 is cylindrical in shape, having an internal uniform diameter passageway 18. The outer peripheral surface of the nipple 10 is constituted by a reduced diameter stem portion 20 which terminates in an annular, radially outwardly extending shoulder 22 which in turn merges with a short length of cylindrical surface 24. This cylindrical surface 24 is joined by a forwardly extending frusto-conically shaped or tapered end portion 26 which is interrupted between its inner and outer peripheral portions by an intermediately positioned cylindrical guide portion 28 having an axial extent of such dimension as will become apparent from the following description. A small, axially extending key 30 is provided on the cylindrical surface 24 for a purpose to be explained more fully hereafter.

The ring clamp 14 is rotatably received on the stem surface of the nipple 10 with the threaded end 32 abutting against the shoulder 22. A spring wire retaining ring 34 may be mounted on the stem surface 20 for retaining the ring clamp 14 in place on the nipple 10.

The left end of the nipple 10, and similarly the right hand end of the receptacle 12, is suitably shaped to receive therein, or thereon the end section of a length of pipe or tubing. The inner diameter 36 is adapted to receive the outer surface of one size of a section of tubing, and the outer surface 38 is insertable into the end opening of a section of different size tubing. With this arrangement of sizes, the same nipple 10 or receptacle 12 may be used for coupling two different sizes of tubing together, for example, tubing having a ¾" outer diameter, and tubing having a ⅞" inner diameter.

The coupling receptacle 12 is provided on its left-hand end with a frusto-conically shaped socket 40 having a configuration which is complementary to the end portion 26, 28 of the nipple 10. An annular fitting 16 having internal threads 42 is affixed to the outer periphery of the receptacle 12, and in the preferred arrangement is provided with an axially extending slot 44 adapted to receive an axially extending key 46 provided on the outer receptacle surface and the nipple key 30. With this arrangement, the fitting 16 is held against rotation with respect to the receptacle 12. A ring retainer 48 is used to hold the fitting 16 onto the receptacle 12.

In operating the coupling just described, the nipple 10 is inserted in the fitting 16 with the key 30 fitting into the key-way 44. The threads on the ring clamp 14 are then joined with the threads 42 of the fitting 16 for clamping securely the two portions of the coupling 10, 12 securely together as shown. In separating the coupling, the ring clamp 14 is merely unscrewed from the fitting 16 thereby allowing the complete separation of the male and female sections of the coupling assembly.

If the inner diameter 50 of the receptacle 12 is made equal to the diameter 18 of the nipple 10, it is seen that a passageway of uniform continuous diameter is provided through the entire coupling assembly. With this arrangement, the ring clamp 14 in conjunction with the fitting 16 may be operated to clamp securely the coupling parts 10 and 12 so tightly together that no leakage can occur between the mating surfaces 26 and 40. Furthermore, a sealing engagement between the two coupling parts 10 and 12 is insured by the mating cylindrical portions, indicated by the reference numeral 28, which conjointly serve to prevent any radial misalignment between the two parts 10 and 12.

This cylindrical fit 28 further serves to provide complete rigidity between the two parts 10 and 12 by serving as a radial bearing which resists relative bending moments between the two parts 10 and 12. For example, if it is assumed that this cylindrical fit 28 is not present in the coupling as illustrated, a bending moment applied between the two parts 10 and 12 will serve to move the two parts along the tapered surfaces out of coaxial alignment thereby tending to break the seal, and further tending to damage these mating portions to such an extent as to require their replacement. Now by the use of the cylindrical section as illustrated, it is seen that bending moments applied between the parts 10 and 12 will be resisted by the cylindrical surface thereby accomplishing effective sealing against leakage and also complete rigidity against coaxial misalignment or separation of the parts. Again, the desired resistance against the bending moments will dictate the axial length of cylindrical surface 28 needed.

The matter of bending moments which may be applied to pipe couplings is of particular importance in the instance whereby couplings are used on relatively large pipe lines such as those which conduct large volumes of petroleum or the like for great distances. During assembly of these pipe lines, it is often necessary to lift one end of a long section of joined lengths of pipe whereupon bending moments are applied along the entire extent of the section and to each of the couplings as well. By the use of the cylindrical sections 28, the couplings are made sufficiently strong and rigid so as to prevent the breakage thereof or damage of such a nature as will interfere with the sealing qualities thereof.

It is of importance that the construction of Fig. 1 will accommodate piping of any material, such as metal or plastic. If the coupling is to be used to join elements of plastic tubing together, the coupling parts 10 and 12 are preferably made of plastic material also. The ring clamp 14 and the fitting 16 are, however, made of metal since no plastic material has yet been developed which will accommodate screw threads for serving the purposes of this invention. Now with parts 10 and 12 being made of plastic material, it is seen that the coupling will provide a seal effective against the communication of any liquid conducted by the passageway 18, 50 to the metal parts 14 and 16. Thus, liquids corrosive of metal may be conducted by a piping arrangement incorporating couplings of this invention without any fear of the corrosive liquids attacking the metallic parts of the coupling.

Figure 2:
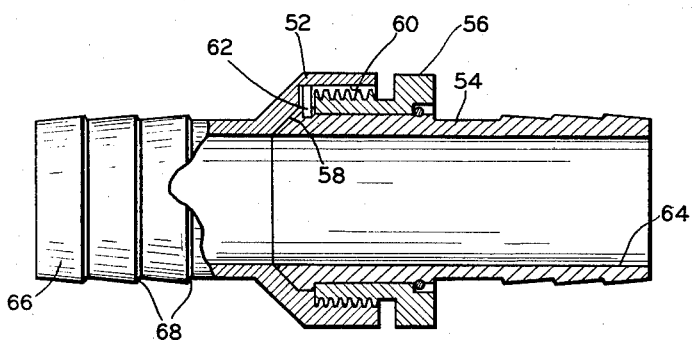
Fig. 2 is a similar axial section of another embodiment of this invention.

With reference now to Fig. 2, a coupling assembly similar to the assembly of Fig. 1 is shown as being comprised essentially of a single, internally threaded tubular female part 52 and a tubular male coupling nipple 54, which is clamped securely to the female part by means of the ring clamp 56. This ring clamp 56 may be identical to the clamp 14 of Fig. 1. The mating ends of the parts 52 and 54 may be tapered as at 58 to provide a seal-tight joint, and as in the case of Fig. 1, key-way 60 is provided in the internally threaded portion of the receptacle 52 for receiving a key 62 carried on the left end of the nipple 54. Operation of this clamp of Fig. 2 is the same as that for Fig. 1, ring clamp 56 being threadedly received by the receptacle 52. With the coupling parts joined as shown, a uniform diameter passageway 64 is provided therethrough. In this embodiment, the receptacle 54 may be made of either plastic or metal, and the left end 66 may be threaded or provided with annular ridges 68 as shown. Similarly, the coupling nipple 54 may be made of either metal or plastic, the material used depending upon the purposes to which the coupling is to be put.

Figure 3:
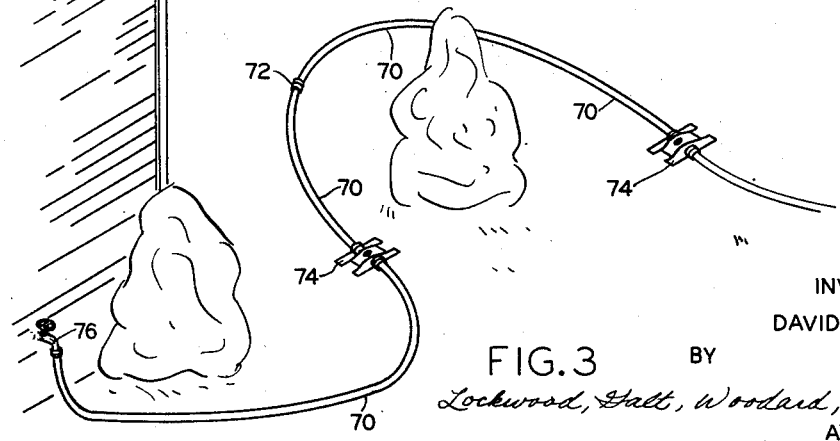
Fig. 3 is a pictorial illustration of one use to which either of the couplings of the preceding figures may be put.

Another use to which the concepts of the two embodiments of this invention, as illustrated in Figs. 1 and 2, may be susceptible is illustrated by the arrangement of Fig. 3 in which a plurality of sections of garden hose 70 are shown as being joined together by a coupling 72 of this invention and a number of water spray units 74. The left end section 70 of the assembled hose is shown as being connected to a sill-cock or spigot 76 of conventional design.

In conventional systems which utilize the screw type of coupling for connecting the hose sections together, such couplings are often loosened merely by exerting a pull on the length of assembled hose sections. This occurs when an individual section 70 is twisted and which tends to straighten or untwist when a tension force is applied to the hose. This straightening action is transmitted to the coupling, and if the twist is in the proper direction, the screw coupling will be loosened thereby breaking the seal between the two hose sections and causing leakage.

Now in the use of the present invention, it is seen that the key and slot connection will resist positively any torsional forces exerted by the various hose sections and will not permit the threaded parts from being loosened.

To demonstrate the versatility of the aforedescribed couplings, reference is made to Figs. 4 to 8 of the drawings, and particularly to Fig. 4 thereof which shows a sprinkling system incorporating a coupling 72, and in addition another coupling 77 which may be characterized as a T-coupling. This T-coupling 77 (Fig. 5) has three right angle communicating passages 78, these passages being preferably identical to each other. Each passage 78 is preferably formed with the same internal dimensions as, for example, receptacle 52 of Fig. 2, and comprises essentially an internally threaded opening 80 which terminates in a tapered seat 82 and which is further provided with an axially extending key slot 84. These described parts of the T-coupling are made of such size as to accommodate the male coupling 54, 56, for example (Fig. 2), so that the T-coupling may be interchangeable with the receptacle 52 of Fig. 2 or the part 12, 16 of Fig. 1.

As seen in Fig. 4, the annular clamp 14 serves to couple the right end of the conduit section 70 to one arm of the T-coupling 77 and two other conduit sections 86 and 88 are coupled to the other two arms, respectively. The male coupling subassemblies previously described may be used for securing all of these conduit sections to this T-coupling. The conduit 86 may be flexible, as shown, and constitute one of the pieces 70 of Fig. 3.

In one spraying system, a coupling 72, identical to that shown in Fig. 3, and either of the ones of Figs. 1 or 2, serves to connect the flexible section 86 with a rigid conduit extension 90 which is capped on its outer end by means of a tip or end fitting 92. The capped end of this conduit section 90 is preferably provided with a male coupling sub-assembly 14 which may be fitted into and closed off by the end fitting 92.

Since this arrangement of Fig. 4 normally lies on the surface of the ground, it is desirable that all parts of the conduit system be maintained in corresponding axial alignment and this is accomplished by the use of the standard or positioning support 94 designed to clamp firmly the end fitting 92 and to retain the latter against rotary or angular movement with respect to the ground surface.

The end fitting 92 is simply a cap-shaped internally threaded part having the key slot 96 for receiving the key of the male coupling sub-assembly. The purpose of this cap 92 is merely to seal off the end of the conduit system.

The standard 94 is comprised of an elongated flat base 99 having a centrally raised portion provided with upturned side flanges 100 and 102. Intermediate the ends of this base 99 is affixed a U-shaped spring clamp 104 which is sized to receive in firm clamping engagement the cap fitting 92, and which is provided with a resilient upwardly curved base 105. A screw 106 and sheet metal nut 107 are used to secure this clamp 104 to the base 99, and when tightened serve to draw the base 105 downwardly and the clamp 104 sides inwardly. Thus an adjustment providing a desired degree of clamping force is achieved. As more clearly seen in Fig. 8, the axis of the clamp 104 is arranged at right angles to the longitudinal dimension of the base 99, with the axial dimension of the clamp 104 being almost co-extensive with the dimension between the two flanges 100 and 102, so that assembly of the cap fitting 92 into the clamp 104 will result in the fitting 92 being retained against relative movement with respect to the base 99 by engagement with the flanges.

Returning to Fig. 4, it is seen that a number of axially arranged perforations 110 are provided in the conduit sections 88 and 90, which serve as the spraying orifices of the sprinkling system. It is obvious that it would be necessary for these spraying orifices 110 on conduit 88 to always be positioned upright regardless of the number of times the coupling 14, 76 is operated to assemble and disassemble the conduit sections. By the use of the couplings of this invention, these spraying orifices will, positively, be maintained in such proper upright position.

Now in one spraying arrangement, the orifices 110 are so positioned that water will be sprayed upwardly and to one side of the conduit, the resulting spraying action serving to wet an elongated area having a length coincident with the line of conduit sections. If it is desired to spray more to one side of the conduit than to the other, it is only necessary to twist slightly, for example, the conduit 90 in the clamp 104 thereby aiming the associated orifices 110 to one side. The adjustable clamp 104 serves to hold the conduit section 90 in this angular position so that the resultant spray will be toward the selected side. This feature is particularly advantageous when it is desired to spray the base of bushes or to spray a row of crops which lies to one side of the length of spraying conduit.

It will now appear obvious to the person skilled in the art that any number of sprinkling patterns may be accomplished by utilizing the principles of this invention. Also, the section 90 may be easily maneuvered endwise or laterally for positioning it relative to an area to be sprayed. The section 90 being rigid and preferably made of light weight plastic, it is susceptible to facile handling making the arrangement especially useful for watering lawns, hedges, and the like.

What is claimed is:

1. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, two sections of tubular conduit fixedly secured to said nipple and said receptacle, respectively, said sections thereby being joined together to form an integrated length of fluid-conducting conduit, and a series of axially aligned spray orifices provided in at least one section, said coupling device serving to position said orifices in predetermined axial alignment with respect to the other section of conduit regardless of the number of times said nipple and said receptacle may be assembled or disassembled.

2. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, two sections of tubular conduit fixedly secured to said nipple and said receptacle, respectively, said sections thereby being joined together to form an integrated length of fluid-conducting conduit, a series of axially aligned spray orifices provided in at least one section, said coupling device serving to position said orifices in predetermined axial alignment with respect to the other section of conduit regardless of the number of times said nipple and said receptacle may be assembled and disassembled, and a positioning support detachably clamped on one of said conduit sections and having a base portion engageable with a flat surface, said base serving to resist angular movement of said conduit sections from a selected angular position thereof.

3. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, two sections of tubular conduit fixedly secured to said nipple and said receptacle, respectively, said sections thereby being joined together to form an integrated length of fluid-conducting conduit, a series of axially aligned spray orifices provided in at least one section, said coupling device serving to position said orifices in predetermined axial alignment with respect to the other section of conduit regardless of the number of times said nipple and said receptacle may be assembled and disassembled, and a positioning support detachably clamped on one of said conduit sections and having a base portion engageable with a flat surface, said positioning support further comprising two spring clamps which operatively grip one of said conduit sections in such a manner as to prevent relative movement between said one conduit section and said positioning support, said clamps being fixedly secured to said base.

4. An adjustable spray device comprising a conduit member having a plurality of spray openings therein, a coupling nipple having a passageway therethrough and being fitted to said member, an annular clamp rotatably mounted on said nipple, a cap fitting detachably secured to said nipple for closing said passageway, said nipple having a key on the outer periphery thereof, said fitting having an axially extending key slot adapted to receive therein said key whereby said nipple and said fitting are held against relative rotational movement, and a positioning support detachably clamped onto said fitting for retaining said nipple in a selected angular position, said support comprising an elongated flat base, and a spring clamp provided on said base between the ends thereof, said clamp being engageable with the outer periphery of said fitting for holding the latter in position with respect to said base.

5. An adjustable spray device comprising a conduit member having a plurality of spray openings therein, a coupling nipple having a passageway therethrough and being fitted to said member, an annular clamp rotatably mounted on said nipple, a cap fitting detachably secured to said nipple for closing said passageway, said nipple having a key on the outer periphery thereof, said fitting having an axially extending key slot adapted to receive therein said key whereby said nipple and said fitting are held against relative rotational movement, and a positioning support detachably clamped onto said fitting for retaining said nipple in a selected angular position, said support comprising an elongated flat base, a U-shaped clamp having an upwardly curved resilient base portion and being carried by said flat base, and screw means fastening said flat base to said clamp base portion and operable to alter the curvature of this base portion for adjusting the gripping force of said clamp on said fitting.

6. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, one section of tubular conduit fixedly secured to the joined nipple and receptacle to form an integrated length of fluid-conducting conduit, and a series of axially aligned spray orifices provided in said section, said coupling device serving to position said orifices in predetermined axial alignment with respect to the nipple regardless of the number of times said nipple and said receptacle may be assembled or disassembled.

7. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, a tubular extension on the nipple having a plurality of orifices in the wall thereof, said orifices being positioned in predetermined alignment with respect to said nipple regardless of the number of times said nipple and said receptacle are assembled or disassembled.

8. A coupling device for joining together two sections of tubular conduit comprising a coupling nipple having a passageway therethrough and a frusto-conically shaped end portion, a coupling receptacle having a passageway therethrough and a frusto-conical socket which is shaped complementary to the aforesaid end portion for receiving the latter whereby both passageways may be joined to form a unitary passageway, clamping means carried by said nipple and said receptacle for detachably joining the latter securely together, said clamping means including means whereby said nipple and said receptacle are held against relative rotation, a tubular extension on the receptacle having a plurality of orifices in the wall thereof, said orifices being positioned in predetermined alignment with respect to said nipple regardless of the number of times said nipple and said receptacle are assembled or disassembled.

References Cited in the file of this patent

UNITED STATES PATENTS

| | | |
|---|---|---|
| 506,034 | Burtchaell | Oct. 3, 1893 |
| 925,680 | Burns | June 22, 1909 |
| 1,606,837 | Horn | Nov. 16, 1926 |
| 1,675,808 | Kliss | July 3, 1928 |
| 1,906,380 | Johnson | May 2, 1933 |
| 1,906,874 | Platt | May 2, 1933 |
| 1,910,765 | Hanlan | May 23, 1933 |
| 1,911,380 | McFarlin | May 30, 1933 |
| 1,930,833 | Barrett | Oct. 17, 1933 |
| 2,278,479 | Parker | Apr. 7, 1942 |
| 2,284,216 | Kunkel | May 26, 1942 |
| 2,555,053 | Myrick | May 29, 1951 |
| 2,614,887 | Shields | Oct. 21, 1952 |